Figure 1:
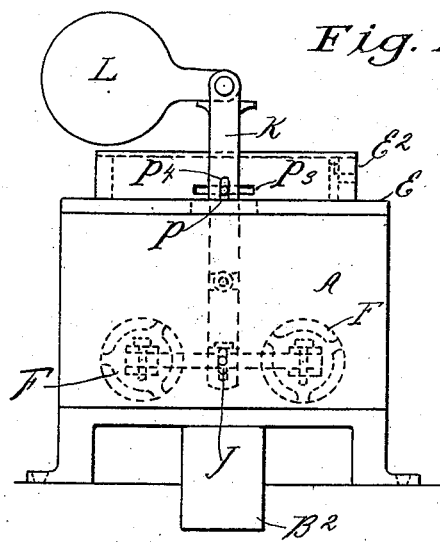

No. 695,691. Patented Mar. 18, 1902.
G. M. MARSHALL.
LIQUID MEASURING AND REGISTERING DEVICE.
(Application filed July 27, 1901.)
(No Model.) 2 Sheets—Sheet 1.

Witnesses:
E. B. Bolton
F. A. Stewart

Inventor:
George M. Marshall
By Edgar Tate & Co
his Attorneys.

No. 695,691. Patented Mar. 18, 1902.
G. M. MARSHALL.
LIQUID MEASURING AND REGISTERING DEVICE.
(Application filed July 27, 1901.)
(No Model.) 2 Sheets—Sheet 2.

Witnesses:
E. B. Bolton
F. A. Stewart

Inventor:
George M. Marshall
By Edgar Tate & Co
his Attorneys.

UNITED STATES PATENT OFFICE.

GEORGE MILLER MARSHALL, OF EDINBURGH, SCOTLAND.

LIQUID MEASURING AND REGISTERING DEVICE.

SPECIFICATION forming part of Letters Patent No. 695,691, dated March 18, 1902.

Application filed July 27, 1901. Serial No. 69,885. (No model.)

*To all whom it may concern:*

Be it known that I, GEORGE MILLER MARSHALL, a subject of the King of Great Britain, residing at Edinburgh, Scotland, have invented certain new and useful Improvements in Liquor Measuring and Registering Devices, of which the following is a full and complete specification, such as will enable those skilled in the art to which it appertains to make and use the same.

This invention relates to devices for measuring and registering liquor and other liquids; and the object thereof is to produce a device of this class designed for measuring and registering correctly any specified quantity of liquor or other liquids, a further object being to provide a device of the class described which will register from one gill up to one thousand gallons and will discharge the liquor or other liquid therefrom in quantities of a quarter-gill or half-pint at each operation thereof; and with these and other objects in view the invention consists of a device of the class specified constructed as hereinafter described and claimed.

The invention is fully disclosed in the following specification, of which the accompanying drawings form a part, in which the separate parts of my improvement are designated by the same reference characters in each of the views, and in which—

Figure 2:
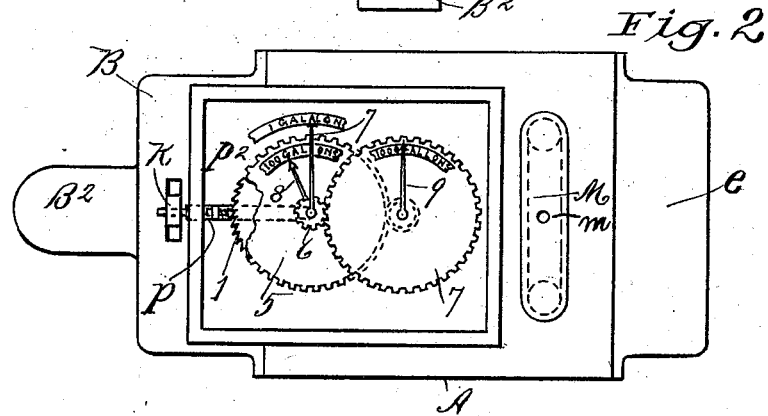
Figure 5:
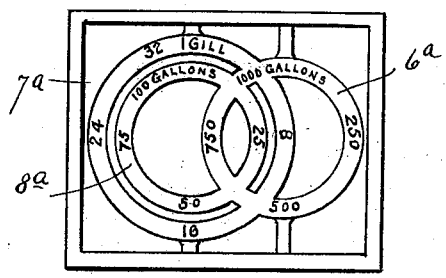
Figure 6:
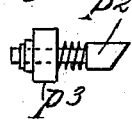
Figure 3:
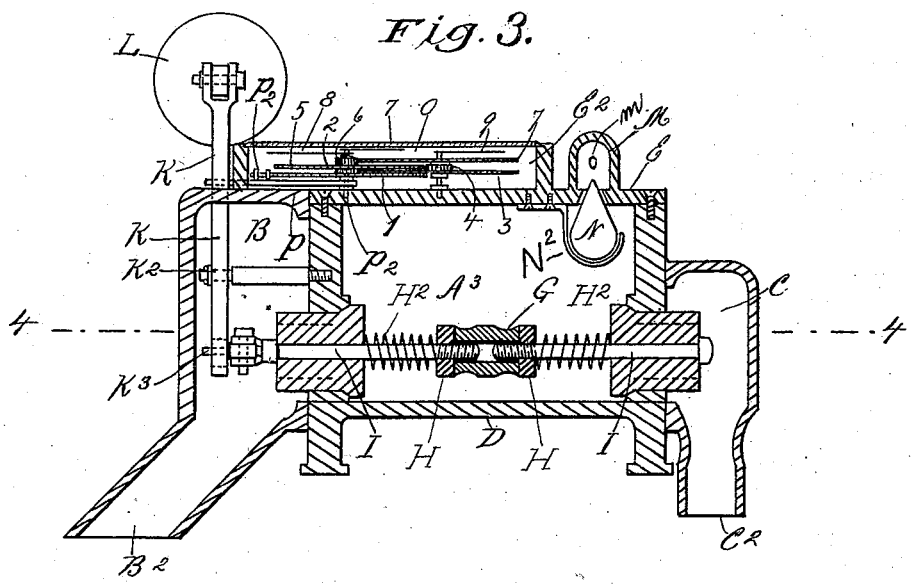
Figure 4:
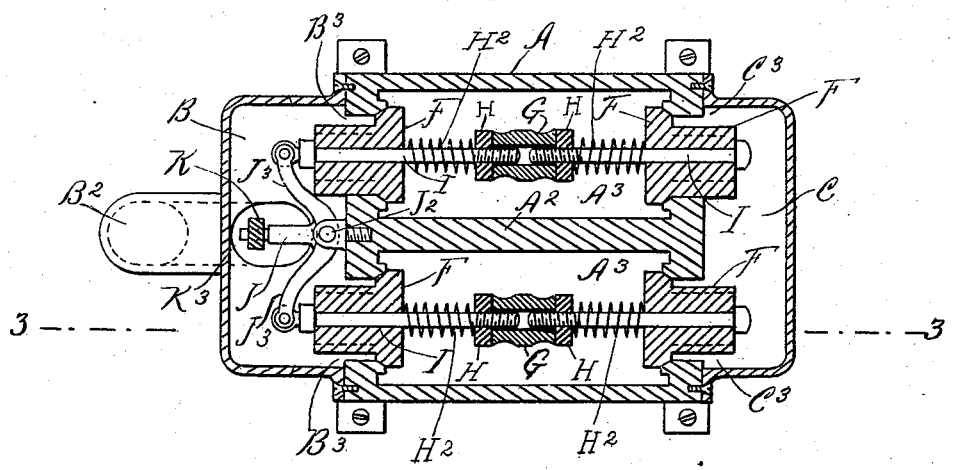

Figure 1 is a front end elevation of my improved liquor measuring and registering device; Fig. 2, a plan view thereof, part of the casing and part of the construction being broken away or removed; Fig 3, a vertical longitudinal section on the line 3 3 of Fig. 4; Fig. 4, a horizontal section on the line 4 4 of Fig. 3; Fig. 5, a plan view of the scales or dial-plates, and Fig. 6 a plan view of a detail of construction.

In the practice of my invention I provide a main casing divided by a longitudinal partition $A^2$, so as to form two measuring-chambers $A^3$, and with the front end of which is connected a casing forming a discharge-chamber B in connection with both of the measuring-chambers $A^3$ and with the rear end of which is connected a casing forming a well or supply-chamber C.

The liquid to be measured is fed into the well or supply-chamber C by means of a supply-pipe, (not shown, but connected therewith in practice at $C^2$,) and the liquid is discharged from the discharge-chamber B through a nozzle $B^2$. The casings forming the discharge-chamber B and the well C are connected with the body of the main casing by set-screws or in any desired manner, and said body of the main casing may also be composed of separate parts connected in any desired manner, the bottom of said main casing being shown at D and the top thereof at E, and the top E of the main casing A is provided with a register-casing $E^2$, in which the registering apparatus is placed.

The measuring-chambers $A^3$ communicate with the discharge-chamber B and the well C through valve-openings $B^3$ and $C^3$, respectively, and these openings are controlled by valves F, which are connected two and two or in pairs in each of the measuring-chambers by means of spindles I and box-nuts G and jam-nuts H, and a vertically-arranged lever K is pivoted at $K^2$ and passes upwardly through the top of the discharge-chamber B and provided at its upper end with a pivoted handle L, and the lower end of said lever is connected at $K^3$ with a lever J, pivoted at $J^2$ and provided with two arms $J^3$, which are connected with the spindles I of the valves F within the discharge-chamber B.

When the lever K is tilted to one side, one valve in one measuring-chamber opens to the well C, while one valve in the other measuring-chamber opens to the discharge-chamber B, and this operation is reversed when the lever K is turned or moved in the opposite direction, said lever being operated by means of the handle L. In no case, however, does the charging-valve open until the discharge-valve in the same chamber has closed. The box-nuts G, the jam-nuts H, and springs $H^2$ are the means of accomplishing this result, their office being to seat the said valves. Arranged transversely of the main casing, over the rear end thereof, is a passage M, provided with a vent-opening $m$, forming a communication between the separate measuring-chambers $A^3$, and this passage is controlled at each end by a suitable valve N, supported by a bracket $N^2$, and by means of this construction the air is allowed to pass from one of the measuring-chambers $A^3$ to the other, and by means of this construction as the liquor or liquid rises in one of said chambers the air is forced into the other and at the proper time the valve N rises and closes the passage M.

The registering apparatus is designated generally by the reference-letter O, and this apparatus is of the following construction: A lever P is pivoted at P² and passes outwardly through the front of the casing of the registering apparatus and through a horizontal slot P³, formed therein, and through a vertical slot P⁴ in the lever K. This lever P is connected with a ratchet-wheel 1, provided with sixty-four teeth and which is caused to rotate by means of the lever P, which is provided with a spring-operated catch P² (shown in detail in Fig. 6) and connected with said lever P by means of an upwardly-directed extension P³, formed thereon, and at each movement of the lever P the catch P² moves the wheel 1 through the space occupied by one of the teeth thereon. The wheel 1 is provided with a wheel 2, having ten teeth, which gears in connection with a wheel 3, having one hundred teeth, and this wheel 3 is provided with a wheel 4, having ten teeth, which gears in connection with a wheel 5, having one hundred teeth, and said wheel 5 is provided with a wheel 6, having ten teeth and which gears in connection with a wheel 7, provided with one hundred teeth.

The wheel 1 is provided with a pointer 7, which operates in connection with a dial or register-scale 7ª and which registers gills from one to thirty-two. The wheel 5 is provided with a pointer 8, which operates in connection with a register-scale or dial 8ª and which registers gallons from one to one hundred, and the wheel 7 is provided with a pointer 9, which operates in connection with a scale or dial 9ª and which registers gallons from one to one thousand, and the scales or dial-plates 7ª, 8ª, and 9ª are clearly shown in Fig. 5.

My improved measuring and registering device is simple in construction and operation and well adapted to accomplish the result for which it is intended, and it will be apparent that changes in and modifications of the construction described may be made without departing from the spirit of my invention or sacrificing its advantages.

Having fully described my invention, what I claim as new, and desire to secure by Letters Patent, is—

1. A liquid measuring and registering device comprising a casing divided longitudinally into two measuring-chambers and provided at one end with a well or supply-chamber and at the opposite end with a discharge-chamber, said measuring-chambers and well and discharge-chambers being in communication; valves connected in pairs in each of the measuring-chambers for controlling said communications, a lever pivoted within the discharge-chamber and connected with each of said pairs of valves, an operating-lever connected with said first-named lever and extending upwardly through the top of the discharge-chamber and a registering apparatus in connection with said operating-lever and adapted to be operated thereby, substantially as shown and described.

2. In a liquid measuring and registering device, a casing divided longitudinally into two separate measuring-chambers, a well or supply-chamber at one end of said casing and a discharge-chamber at the other end thereof, said measuring-chambers being in communication with said well or supply, and said measuring-chambers, valves arranged in pairs in each of the measuring-chambers for controlling the said communications, said valves being connected by spindles provided with box-nuts and also with springs which operate between the box-nuts, and the valves and means for operating said pairs or valves, substantially as shown and described.

In testimony that I claim the foregoing as my invention I have signed my name, in presence of the subscribing witnesses, this 31st day of December, 1900.

GEORGE MILLER MARSHALL.

Witnesses:
WM. PATERSON,
FRANCES W. NISBETT.